Dec. 8, 1931.  J. WILLIAMS  1,835,833
DEVICE FOR PREVENTING ACCUMULATION OF FROST ON WINDSHIELDS
Filed March 14, 1930
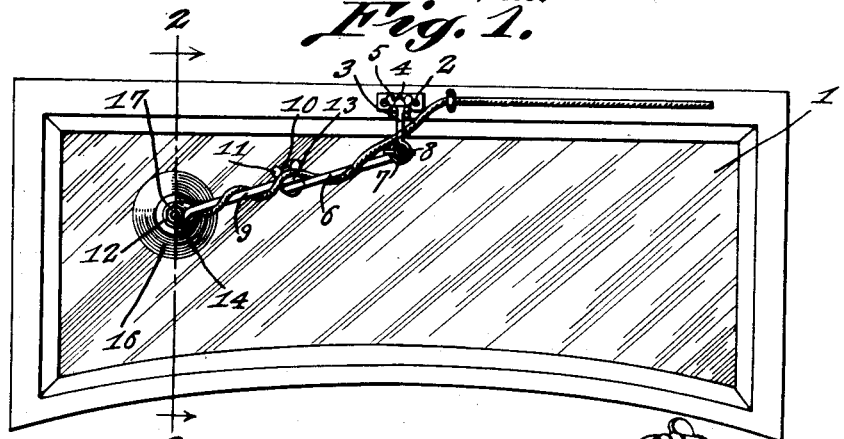
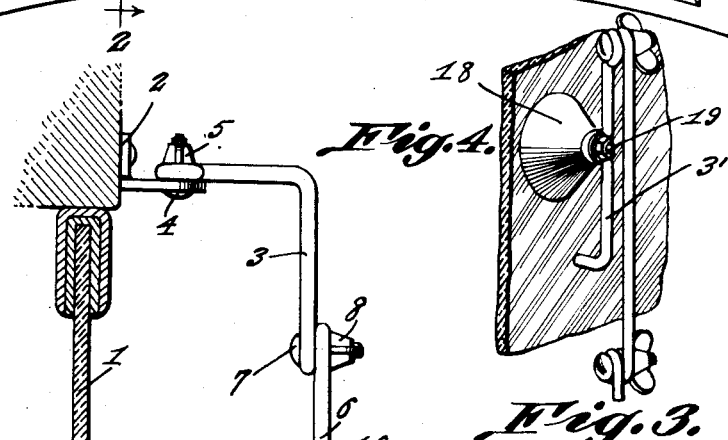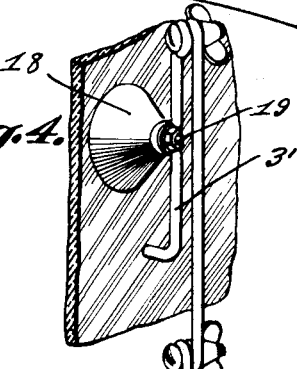
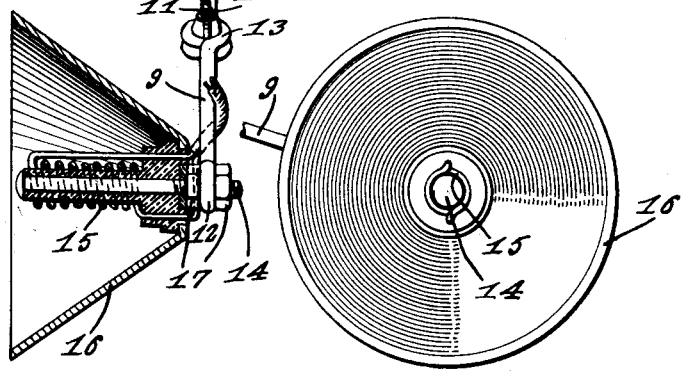
Joseph Williams, INVENTOR
BY Victor J. Evans
ATTORNEY Patented Dec. 8, 1931

1,835,833

UNITED STATES PATENT OFFICE

JOSEPH WILLIAMS, OF YORK, PENNSYLVANIA, ASSIGNOR OF ONE-HALF TO JOHN F. SCHELLHAAS, OF YORK, PENNSYLVANIA

DEVICE FOR PREVENTING ACCUMULATION OF FROST ON WINDSHIELDS

Application filed March 14, 1930. Serial No. 435,876.

My present invention has reference to a device for insuring a clear vision through the windshields of automobiles and the object of the invention is the provision of a device for this purpose that includes a heating element which is arranged in the center of a conical reflector and which is supported adjacent to the inner face of a windshield in a manner that will permit of the said casing being turned arcuately over the windshield or swung and sustained at desired positions with respect to such windshield, so that the windshield can be heated to a desired degree to eliminate the accumulation of frost thereon and also whereby the device is removably attached to the automobile.

To the attainment of the foregoing the invention consists in the improvement hereinafter described and definitely claimed.

In the drawings:

Figure 1 is an elevation of the improvement in applied position.

Figure 2 is an enlarged sectional view on the line 2—2 of Figure 1.

Figure 3 is a face view looking toward the conical reflector and the heating element therein.

Figure 4 is a detail perspective view to illustrate a manner in which the device may be supported by a vacuum cup on the windshield.

In the preferred embodiment of my invention I fix to the top and on the inner face of the automobile, directly above the windshield 1 an angle bracket 2. On the horizontal arm of this bracket there rests the inner end of a right angle rod 3, a pivot 4 engaged by a binding element 5 passing through the bracket and through the end of the rod. The depending or vertical end of the rod 3 is disposed in lapping relation with one end of another rod 6, a pivot 7 passing through the ends of these rods and the said pivot being engaged by a binding nut 8. The rod 6 has its outer end formed with an eye that is arranged at right angles with respect to the eye end thereof through which the pivot 7 passes and this eye is in lapping relation with a similar eye formed on the end of a third rod 9. A pivot 10 passes through the eye ends of the rods 6 and 9 and the said pivot is engaged by a binding nut 11. The second and outer end of the rod 9 is provided with an eye 12 which is arranged right angularly with respect to the first mentioned eye that is indicated by the numeral 13 and the eye 12 has passed therethrough a bolt element 14 that secures the core of a heating coil 15 centrally in a conical casing or reflector 16. The bolt 14 has screwed thereon nuts 17 that contact with the opposite faces of the eye 12 on the rod 9. Suitable wires lead to the heating element 15 and these wires are, of course, connected with the ignition system of the automobile and the current through the wires is controlled by a suitable switch (not shown).

The improvement may be swung on the pivot 4, on the pivot 7 or on the pivot 10 so that the casing 16 and the heating element therein may be caused to move arcuately over the face of the glass of the windshield 1 or to be brought away from the glass so that the proper amount of heat will be directed against the glass to warm the same and to prevent the accumulation of frost or the like thereon and at the same time such heat will not be great enough to injure the glass.

The device when not required for use may be readily removed from the automobile by simply unscrewing the bolt 5 from the pivot 4, the bracket 2 remaining a permanent fixture.

If desired the support for the improvement may be removably attached to the windshield glass by a vacuum cup 18 as disclosed by Figure 4 of the drawings, in which instance, the rod 3' is headed and is pivotally secured, as at 19, to the center of the vacuum cup and the end of the rod which is normally formed with the eye for the pivot bolt 4 is offset to provide a finger whose end is in direct contact with the face of the windshield to assist the vacuum cup in proper contacting engagement with the said windshield and likewise to prevent undue pressure between the vacuum cup and windshield.

Having described the invention, I claim:

A support for a heating anti-frost device for automobile windshields, comprising an angle rod having both of its ends formed with eyes arranged in opposite planes and one of said eyes being pivoted by a binding element to the support, a second and straight rod having eye ends disposed at right angles to each other and an adjustable binding pivot passing through the outer end of the angle rod and through one of the eyes of the straight rod, a third rod which is also straight and which has its ends formed with eyes that are arranged at right angles to each other, an adjustable binding pivot passing through one of said eyes and through the free eye of the second named rod and the heating element having a bolt extension which is passed through the outer eye of the last named rod and which bolt is engaged by a nut.

In testimony whereof I affix my signature.

JOSEPH WILLIAMS.